United States Patent
Kang et al.

(10) Patent No.: US 12,443,047 B2
(45) Date of Patent: Oct. 14, 2025

(54) OPTICAL COMPONENT, OPTICAL MODULE, AND COMMUNICATIONS DEVICE

(71) Applicant: HUAWEI TECHNOLOGIES CO., LTD., Guangdong (CN)

(72) Inventors: Jingran Kang, Shenzhen (CN); Zhiyong Xiao, Wuhan (CN); Huafeng Lin, Dongguan (CN); Yuanmou Li, Dongguan (CN); Wei Ling, Dongguan (CN); Zhang Wei, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1192 days.

(21) Appl. No.: 17/155,336

(22) Filed: Jan. 22, 2021

(65) Prior Publication Data
US 2021/0141235 A1    May 13, 2021

Related U.S. Application Data

(63) Continuation of application No. PCT/CN2018/096607, filed on Jul. 23, 2018.

(51) Int. Cl.
*G02B 27/14* (2006.01)
*G02B 27/10* (2006.01)
(Continued)

(52) U.S. Cl.
CPC ....... *G02B 27/141* (2013.01); *G02B 27/1006* (2013.01); *G02B 27/145* (2013.01);
(Continued)

(58) Field of Classification Search
None
See application file for complete search history.

(56) References Cited

U.S. PATENT DOCUMENTS

2003/0063844 A1    4/2003    Caracci et al.
2004/0101247 A1    5/2004    Chen et al.
(Continued)

FOREIGN PATENT DOCUMENTS

CN    1643422 A    *    7/2005    ........... G02B 6/3877
CN    202159164 U        3/2012
(Continued)

OTHER PUBLICATIONS

Office Action in Korean Appln. No. 10-2021-7004561, dated Sep. 30, 2022, 6 pages (with English translation).
(Continued)

*Primary Examiner* — Leslie C Pascal
(74) *Attorney, Agent, or Firm* — Fish & Richardson P.C.

(57) ABSTRACT

This application provides an optical component including a base, a light splitting structure, a first filter, and a collimation lens, where a first optical signal on a first path is incident on a light splitting surface of the first filter through a light inlet/outlet; the light splitting surface of the first filter reflects the first optical signal to the collimation lens along a second path, where the collimation lens disposed on the second path is configured to convert the first optical signal on the second path into parallel light; and the first optical signal includes a signal of at least one type of wavelength, and the light splitting structure is disposed on an emergent path of the first optical signal after the first optical signal passes through the collimation lens, and is configured to output, based on the wavelength type, the first optical signal adjusted by the collimation lens.

20 Claims, 7 Drawing Sheets

(51) Int. Cl.
  *G02B 27/30* (2006.01)
  *H04B 10/50* (2013.01)
  *H04B 10/60* (2013.01)

(52) U.S. Cl.
  CPC .............. *G02B 27/30* (2013.01); *H04B 10/50* (2013.01); *H04B 10/60* (2013.01)

(56) References Cited

U.S. PATENT DOCUMENTS

| | | |
|---|---|---|
| 2010/0290128 A1 | 11/2010 | Sugitatsu |
| 2014/0314422 A1 | 10/2014 | Shao et al. |
| 2015/0037038 A1 | 2/2015 | Takahashi et al. |
| 2016/0004020 A1 | 1/2016 | Shao et al. |
| 2016/0246019 A1* | 8/2016 | Ishii ................... G02B 6/4246 |

FOREIGN PATENT DOCUMENTS

| | | | |
|---|---|---|---|
| CN | 103955033 A | | 7/2014 |
| CN | 205157849 U | | 4/2016 |
| CN | 105739032 A | | 7/2016 |
| CN | 205656355 U | | 10/2016 |
| CN | 106888066 A | | 6/2017 |
| CN | 106896453 A | | 6/2017 |
| CN | 107045168 A | | 8/2017 |
| CN | 206450866 U | | 8/2017 |
| CN | 107422430 A | | 12/2017 |
| CN | 107479145 A | | 12/2017 |
| CN | 108152897 A | | 6/2018 |
| CN | 108627920 A | * | 10/2018 |
| CN | 208421302 U | * | 1/2019 .......... G02B 6/2773 |
| JP | H1123893 A | | 1/1999 |
| JP | 2005309370 A | | 11/2005 |
| JP | 2009105106 A | | 5/2009 |
| JP | 2009134157 A | | 6/2009 |
| JP | 2009290097 A | | 12/2009 |
| JP | 2011248210 A | | 12/2011 |
| JP | 2014010172 A | | 1/2014 |
| JP | 2015520414 A | | 7/2015 |
| JP | 2016156849 A | | 9/2016 |
| KR | 20060122016 A | | 11/2006 |
| KR | 101001277 B1 | | 12/2010 |
| KR | 101270744 B1 | | 6/2013 |
| KR | 101741039 B1 | | 6/2017 |

OTHER PUBLICATIONS

Extended European Search Report issued in European Application No. 18927584.5 on Jun. 1, 2021, 20 pages.
Office Action issued in Chinese Application No. 201880065368.2 on Sep. 9, 2020, 20 pages (with English translation).
Office Action issued in Chinese Application No. 201880065368.2 on Nov. 30, 2021, 7 pages (with English translation).
Office Action in Japanese Appln. No. 2021-503018, dated Nov. 1, 2022, 10 pages (with English translation).
Office Action issued in Chinese Application No. 201880065368.2 on Aug. 18, 2021, 10 pages.
Office Action issued in Japanese Application No. 2021-503018 on Mar. 1, 2022, 18 pages (with English translation).

* cited by examiner

OPTICAL COMPONENT, OPTICAL MODULE, AND COMMUNICATIONS DEVICE

CROSS-REFERENCE TO RELATED APPLICATION

This is a continuation of International Patent Application No. PCT/CN2018/096607, filed on Jul. 23, 2018, the disclosure of which is hereby incorporated by reference in its entirety.

TECHNICAL FIELD

This application relates to the field of optical communications technologies, and in particular, to an optical component, an optical module, and a communications device.

BACKGROUND

There is an increasing demand for a network throughput capability in modern society. Optical communication is a mainstream of modern communications schemes, and an optical communications network in the optical communication is mainly in a form of a passive optical network (PON). A communications device mainly includes an optical module, a board on which the optical module is placed, and a subrack (optical line terminal (OLT)). Each optical module corresponds to an optical distribution network (ODN) and serves a specific quantity of users (each optical network unit (ONU) represents a user). As key components of an optical network, optical modules in an OLT and an ONU are responsible for performing optical-to-electrical conversion and transmission on network signals, and are a basis for normal communication in the entire network.

A most important component of an optical module is a bidirectional optical subassembly (BOSA) with which transmission and reception of an optical signal are implemented. The bidirectional optical subassembly is usually packaged in a coaxial transistor-outline can (TO-CAN) form, to implement hermetic package of a chip at low costs. A cap on the TO-CAN is used to implement spatial optical coupling of an optical path from the chip to an optical fiber. A gigabit passive optical network (GPON) component generally includes a transmitter TO and a receiver TO. According to a standard, different wavelengths are used for transmission and reception, and a wavelength division multiplexing (WDM) filter is used to implement light beam multiplexing and demultiplexing.

With upgrading of network bandwidth, a GPON network needs to be upgraded from a GPON to a 10GPON. To ensure compatibility, the GPON and the 10GPON need to exist in a same ODN network. Currently, there are two coexistence modes. One mode is an external WDM1r scheme. Both the GPON and the 10GPON are independent optical modules. After external WDM1r multiplexing is performed on optical signals output by the two networks, a multiplexed optical signal is sent to the ODN network, so that the two networks coexist with each other. The other mode is to integrate a 10GPON component and a GPON component into one optical module. The GPON component and the 10GPON component are combined into the optical module, namely, a combo PON quad optical module. A scheme of the combo PON quad optical module has advantages of saving precious machine room resources, theoretically having a lower insertion loss and providing a more power budget, and the like. Therefore, the scheme is more favored by carriers. Currently, the scheme has become a mainstream 10GPON scheme and also has become a research focus of vendors.

According to a stipulation about a standard in the ITU PON field, a GPON performs transmission by using light of a wavelength of 1490 nm and receives an optical signal of a wavelength of 1310 nm, and an XGPON performs transmission by using light of a wavelength of 1577 nm and receives an optical signal of a wavelength of 1270 nm. Therefore, in a combo component, one optical fiber port needs to be shared in a total of four bands used in the two groups of reception and transmission. In addition, each receive band has a specific spectral width. For example, a receive wavelength range of the GPON is 1290 nm to 1330 nm, and a receive wavelength range of the 10GPON is 1260 nm to 1280 nm. In other words, a difference between receive wavelength intervals of the GPON and the 10GPON in the component is only 10 nm. In addition, a standard protocol requires that light splitting isolations of the GPON and the 10GPON should be greater than 30 dB, and this can be theoretically implemented only by using parallel light and a small angle. Currently, typical combo PON optical components all use parallel optical paths. A collimation lens is placed at a front end of a fiber core. A first filter splits light at a small angle to separate light of a wavelength of 1270 nm, and a second 45° filter on a main optical path separates the remaining light of a wavelength of 1310. A collimation lens needs to be added to a transmit optical path, to be coupled to the fiber core. However, in an existing network compatible with a GPON and a 10GPON, there are disadvantages such as a relatively large quantity of optical path components and devices, a complex coupling process, and a large size of an entire component.

SUMMARY

In view of the foregoing technical problems, this application provides an optical component, an optical module, and a communications device, to separate and transmit a plurality of upstream signals and a plurality of downstream signals by using a simpler structure.

This application is implemented by using the following technical solutions:

According to a first aspect, a specific embodiment of this application provides an optical component, including a base and a light splitting structure, a first filter, and a collimation lens that are disposed on the base, where
  the base is provided with a light inlet/outlet, a light splitting surface of the first filter is disposed facing the light inlet/outlet, and a first optical signal on a first path is incident on the light splitting surface of the first filter through the light inlet/outlet;
  the light splitting surface of the first filter reflects the first optical signal to the collimation lens along a second path, where the first path does not coincide with the second path, the collimation lens is disposed on the second path, and the collimation lens is configured to convert the first optical signal on the second path into parallel light; and
  an optical signal included in the first optical signal has at least one type of wavelength, and the light splitting structure is disposed on an emergent path of the first optical signal after the first optical signal passes through the collimation lens, and is configured to output, based on the wavelength type, the first optical signal adjusted by the collimation lens.

In this application, after a plug-in end sends the first optical signal, the first filter is disposed to directly separate the first optical signal (an upstream signal including a first-wavelength optical signal and a second-wavelength optical signal) from a main optical path. This avoids a complex optical component structure caused when the first-wavelength optical signal and the second-wavelength optical signal that are included in the first optical signal are separately separated from the main optical path.

In a possible design, the first optical signal includes a first-wavelength optical signal and a second-wavelength optical signal, the first-wavelength optical signal and the second-wavelength optical signal have different wavelengths, and the light splitting structure includes a second filter and a third filter;

the second filter is disposed on the emergent path of the first-wavelength optical signal and the second-wavelength optical signal after the first-wavelength optical signal and the second-wavelength optical signal pass through the collimation lens, and the second filter transmits the first-wavelength optical signal and reflects the second-wavelength optical signal along a third path, where the third path does not coincide with the second path;

the third filter is disposed on the third path, the third filter reflects the second-wavelength optical signal along a fourth path, and the fourth path does not coincide with the third path; and the base is further provided with a first light outlet and a second light outlet, the first light outlet is disposed on a transmission path on which the second filter transmits the first-wavelength optical signal, the first light outlet is used for the first-wavelength optical signal to pass through, the second light outlet is disposed on the fourth path, and the second light outlet is used for the second-wavelength optical signal to pass through.

In this application, the light splitting structure is disposed to separate at least two diverging signals separated from the main optical path and output the separated signals from different light outlets.

In a possible design, the optical component further includes a first optical receiver and a second optical receiver, the first optical receiver is disposed on an emergent path at the first light outlet to receive the first-wavelength optical signal, and the second optical receiver is disposed on an emergent path at the second light outlet to receive the second-wavelength optical signal.

In this application, optical signals output from different light outlets are received by using different optical receivers.

In a possible design, the second path is parallel to the fourth path.

In this application, the second path of the output first-wavelength optical signal is parallel to the fourth path of the output second-wavelength optical signal, so that the first optical receiver receiving the first-wavelength optical signal and the second optical receiver receiving the second-wavelength optical signal can be disposed in parallel to each other, thereby forming a simpler structure.

In a possible design, the light splitting structure further includes a fourth filter, the fourth filter is disposed on the fourth path between the third filter and the second light outlet, and the fourth filter transmits the second-wavelength optical signal.

The fourth filter is disposed on the fourth path between the third filter and the second light outlet, and the second-wavelength optical signal is filtered by using the fourth filter, so as to prevent the second optical receiver from receiving a signal other than the second-wavelength optical signal.

In a possible design, the optical component further includes a fifth filter disposed on the base, and the base is provided with at least one light inlet; an optical signal passes through each light inlet and irradiates the fifth filter, and the fifth filter reflects or transmits, to the light inlet/outlet, the optical signal passing through the light inlet; and wavelengths of optical signals passing through the light inlet are different.

In this application, the light inlet is disposed, and an apparatus for transmitting an upstream signal is disposed at the light inlet. In this way, an upstream signal and a downstream signal of an entire device can be transmitted at the same time.

In a possible design, the base is provided with two light inlets: a first light inlet and a second light inlet, the first light inlet is disposed opposite to the light inlet/outlet, and a third optical signal on a fifth path passes through the first light inlet and is incident on the light inlet/outlet; and a light splitting surface of the fifth filter is disposed facing the second light inlet, a fourth optical signal on a sixth path is incident on the light splitting surface of the fifth filter through the second light inlet, and the fifth filter reflects the fourth optical signal to the light inlet/outlet along a seventh path.

Light inlets for two downstream signals are disposed, so that the light inlets of the optical component satisfy a GPON requirement and are compatible with downstream signal transmission of a 10GPON.

In a possible design, the base includes a connecting pipe body and a support disposed on the connecting pipe body, the support includes a first support, the first support is configured to fasten the first filter and the collimation lens, and the light inlet/outlet is disposed on the first support; and the connecting pipe body is configured to fasten the fifth filter, and the first light outlet, the second light outlet, and at least one light inlet are disposed on the connecting pipe body.

The first support is disposed, and an optical device for separating an upstream signal from the main optical path is disposed on the first support, so that the optical device in the optical component is more conveniently disposed.

In a possible design, the collimation lens and the first support are integrally injection molded.

The first support is integrally injection molded, and the first support is mounted as a whole, thereby forming a simpler structure.

In a possible design, the support further includes a second support, and the second support is configured to fasten the light splitting structure.

The second support is disposed, and the light splitting structure is disposed on the second support. This avoids a trouble of arranging the optical device on the support caused by the excessively complex first support.

In a possible design, the optical component further includes a first converging lens disposed on the second path and a second converging lens disposed on the fourth path, and the second support is further configured to fasten the first converging lens and the second converging lens.

The converging lenses are disposed on the second support, so as to avoid that the first optical receiver and the second optical receiver are provided with the converging lenses. In this way, structures of the first optical receiver and the second optical receiver are simpler.

In a possible design, the first converging lens and the second support are integrally injection molded, and the second converging lens and the second support are integrally injection molded.

The converging lenses and the second support are integrally injection molded, so that positions of the converging lenses on the support are more accurate, thereby avoiding a trouble of disassembly and assembly.

In a possible design, the first support and the second support are integrally injection molded.

The first support and the second support are integrally injection molded, so that a structure of the support in the entire optical component is simpler.

In a possible design, the optical component further includes a pin and a ferrule, a ferrule hole is disposed in the pin, the ferrule is fastened in the ferrule hole, one end of the ferrule protrudes from the pin, an end part of the ferrule protruding from the pin is disposed inside the light inlet/outlet, and the ferrule is positioned by the light inlet/outlet.

The ferrule of the plug-in end is disposed at the light inlet/outlet for positioning, and is fastened to the support through the pin, so that a connection position between the plug-in end and the support is more accurate, and a connection is more stable.

In a possible design, the optical component further includes a multiplexing-based transmitter apparatus disposed on the base, and the multiplexing-based transmitter apparatus is disposed opposite to the light inlet/outlet; and the multiplexing-based transmitter apparatus transmits the third optical signal and a fourth optical signal on the fifth path, and the third optical signal and the fourth optical signal on the fifth path are transmitted to the light inlet/outlet.

In this application, a plurality of downstream signals are transmitted by using the multiplexing-based transmitter apparatus, so that a structure that is disposed on the base and that is for downstream signal transmission is simpler.

According to a second aspect, a specific embodiment of this application provides an optical module, where the optical module includes the optical component according to any design of the first aspect.

According to a third aspect, a specific embodiment of this application provides a communications device, where the communications device includes the optical module according to the second aspect. The communications device may be an OLT, an ONU, or another electronic device.

DESCRIPTION OF EMBODIMENTS

The following elaborates on the technical solutions provided in the embodiments of this application with reference to the accompanying drawings.

A specific embodiment of this application provides an optical component. A plurality of upstream signals and/or a plurality of downstream signals are separated from a main optical path by using the optical component. This avoids a relatively large quantity of devices on the main optical path and relatively high costs due to transmission of the plurality of upstream signals and the plurality of downstream signals on the main optical path at the same time. In addition, the optical component in this application further includes a base, and a plurality of optical devices and the like that are included in the optical component are all disposed on the base, so that the optical component is more conveniently disposed.

In this application, a quantity of the plurality of upstream signals and a quantity of the plurality of downstream signals may be determined depending on a specific scenario. This is not limited in this application. Certainly, the quantity of the plurality of upstream signals may be the same as or different from the quantity of the plurality of downstream signals. In the following, this application provides a description by using a passive optical network access network compatible with a GPON and a 10GPON as an example. Certainly, the optical component for multiplexing and demultiplexing the plurality of upstream signals and the plurality of downstream signals may alternatively be applied in another scenario. This is not limited in this application.

Figure 1:
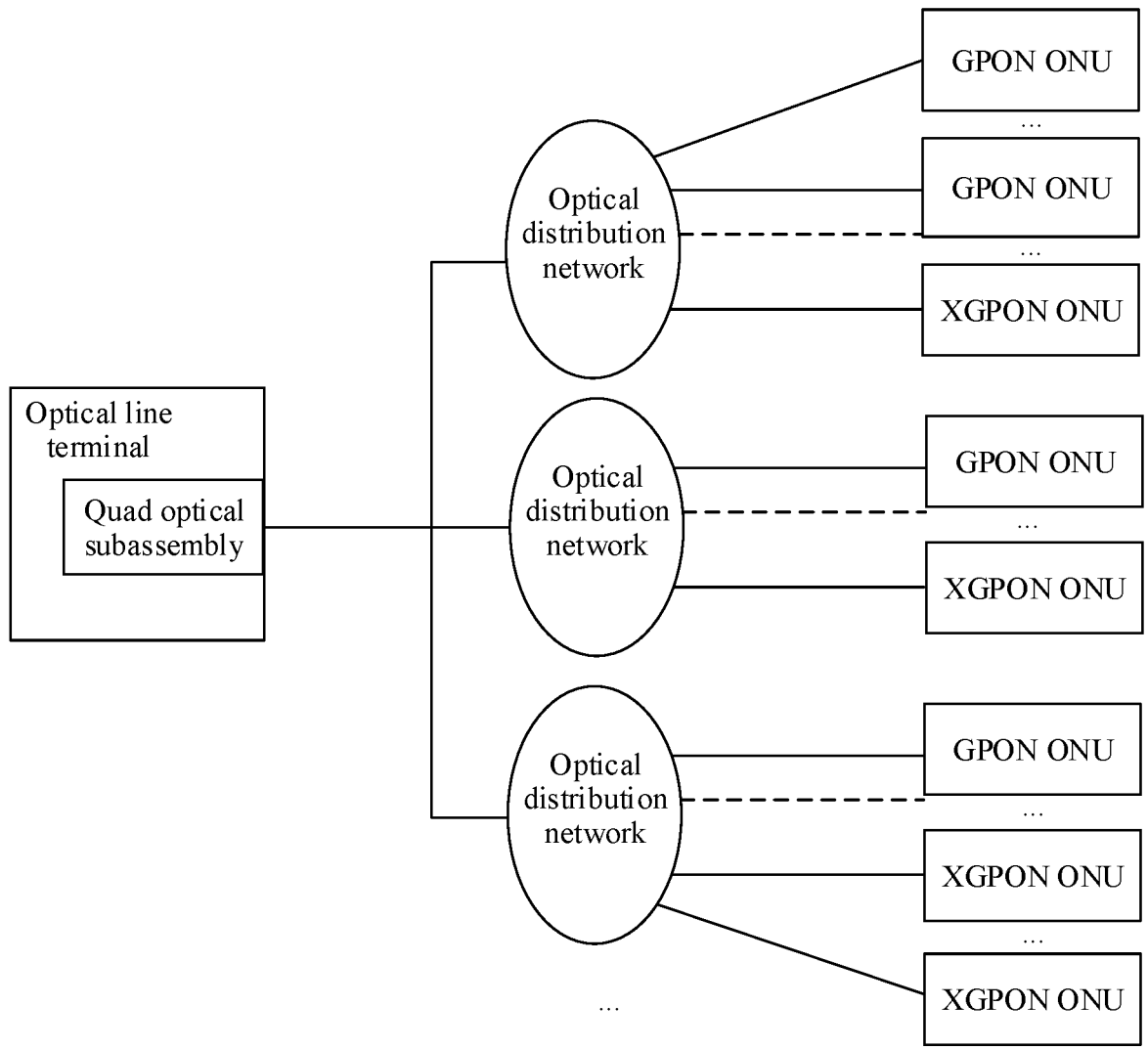
FIG. 1 shows a passive optical network access network compatible with a GPON and a 10GPON according to a specific embodiment of this application.

FIG. 1 shows a passive optical network access network compatible with a GPON and a 10GPON according to a specific embodiment of this application. As shown in FIG. 1, the passive optical network access network includes an optical line terminal (Optical Line Terminal, OLT) and a plurality of optical distribution network (Optical Distribution Network, ODN) devices. The optical line terminal is connected to the plurality of optical distribution network devices, and converts a received electrical signal into an optical signal and transmits the optical signal to the optical distribution network devices. In addition, the OLT may further be configured to implement ONU control, management, ranging, and other functions. The ODN device is configured to connect to an optical network unit (Optical Network Unit, ONU) of a user side and send a data signal (an optical signal) to the ONU device of the user side.

In this specific embodiment of this application, the passive optical network access network is a passive optical network access network compatible with a GPON and a 10GPON. Therefore, a signal sent by the OLT to the ODN includes both an optical signal of the GPON and an optical signal of the 10GPON. The ODN device provides, based on different ONU types (network bandwidth that is purchased by users and that corresponds to ONUs), different ONUs with a data service satisfying the GPON or the 10GPON requirement.

The ONU device then converts, from an optical signal into an electrical signal, a downstream signal sent by the ODN, to provide a network service to the user. The ONU device converts, from electrical signals to optical signals, an upstream signal sent by the user to the ONU device, and sends the optical signals to the OLT through the ODN.

According to a stipulation provided by the International Telecommunication Union (International Telecommunication Union, ITU) about a standard in the passive optical network (Passive Optical Network, PON) field, a GPON uses light of a wavelength of 1490 (1480-1500) nm to send a downstream signal and uses light of a wavelength of 1310 nm to send an upstream signal, and an XGPON uses light of a wavelength of 1577 (1575-1580) nm to send a downstream signal and uses light of a wavelength of 1270 nm to send an upstream signal. In other words, a difference between receive wavelength intervals of the GPON and the 10GPON in a component is only 10 nm. Therefore, in the quad optical component, one optical fiber port needs to be shared by two groups of received and sent optical signals, namely, a total of four optical signals of different wavelength.

The OLT in this specific embodiment of this application further includes a quad optical module. The quad optical module enables the OLT to receive a 1490-nm upstream signal of the GPON and a 1577-nm upstream signal of the XGPON. The quad optical module transmits, to the ONU for the OLT, a 1270-nm downstream signal of the GPON and a 1310-nm downstream signal of the XGPON.

The following describes a structure of a quad optical device for transmitting two upstream optical signals and two downstream optical signals.

Figure 2:
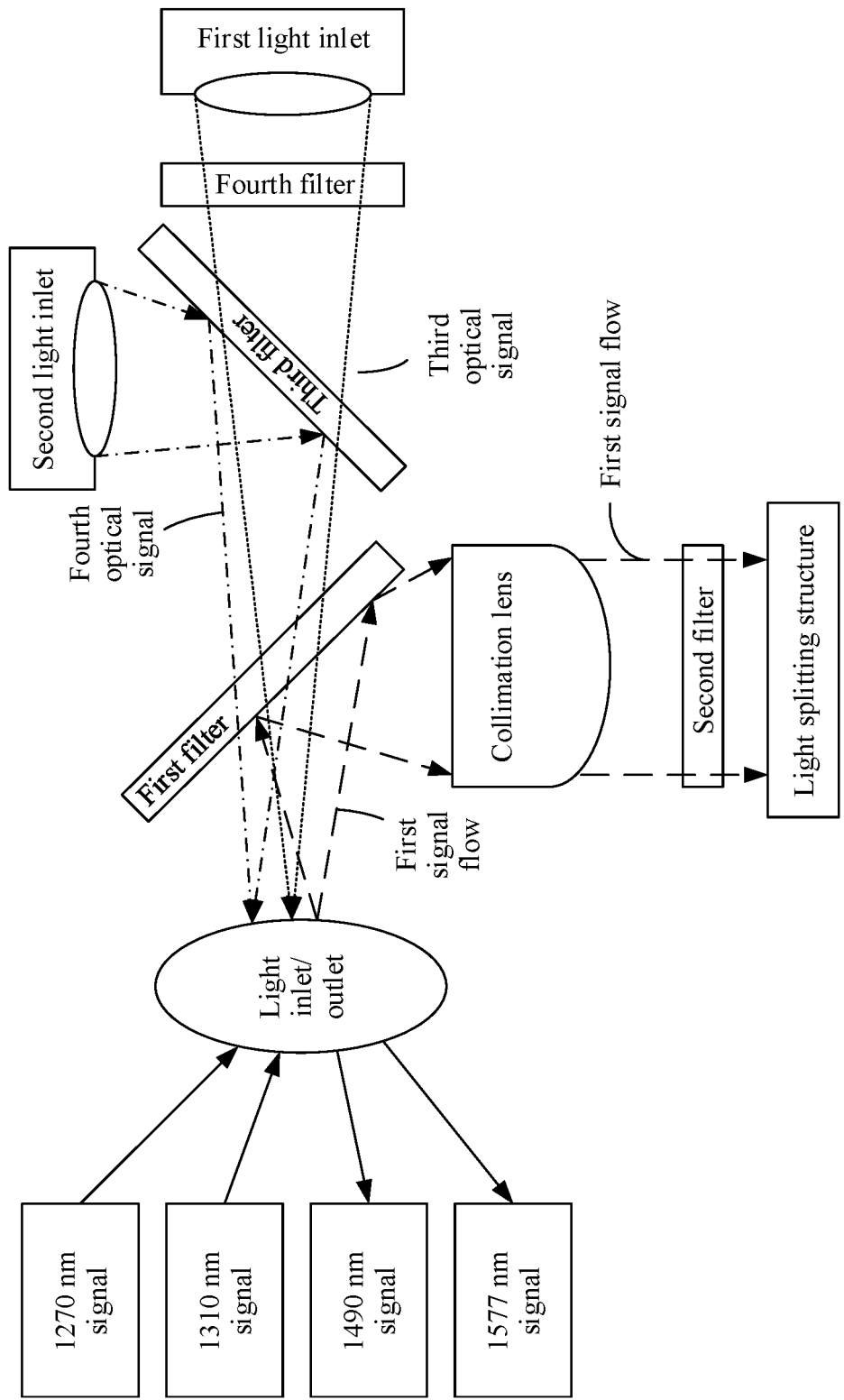
FIG. 2 is a schematic structural diagram of a quad optical component according to a specific embodiment of this application.

FIG. 2 is a schematic structural diagram of a quad optical component according to a specific embodiment of this application. As shown in FIG. 2, the quad optical component includes a base and a light splitting structure, a first filter, a collimation lens, a second filter, and a third filter that are disposed on the base.

The base is further provided with a light inlet/outlet, a first light inlet, a second light inlet, a first light outlet, and a second light outlet. A plug-in end is further disposed at the light inlet/outlet, and the plug-in end receives a first-wavelength optical signal and/or a second-wavelength optical signal (a first optical signal), and transmits a third optical signal and a fourth optical signal. A first optical transmitter and a second optical transmitter are further disposed at the first light inlet and the second light inlet, respectively. The first optical transmitter transmits the third optical signal, and the second optical transmitter transmits the fourth optical signal. A first optical receiver and a second optical receiver are further disposed at the first light outlet and the second light outlet, respectively. The first optical receiver receives the first-wavelength optical signal transmitted from the light inlet/outlet, and the second optical receiver receives the second-wavelength optical signal transmitted from the light inlet/outlet.

In an example, the plug-in end receives the first optical signal, where the first optical signal includes the first-wavelength optical signal and the second-wavelength optical signal. The first-wavelength optical signal is an upstream signal that satisfies a 10GPON requirement, and the first-wavelength optical signal is an optical signal in a frequency band of 1260 nm to 1280 nm. The second-wavelength optical signal is a downstream signal that satisfies a 10GPON requirement, and the second-wavelength optical signal is an optical signal of 1300 nm to 1320 nm. Certainly, the first-wavelength optical signal may also be referred to as an optical signal of 1270 nm, and the second-wavelength optical signal may also be referred to as an optical signal of 1310 nm. The third optical signal transmitted by the first optical transmitter is an upstream signal that satisfies the GPON requirement, and the third optical signal is an optical signal in a frequency band of 1480 nm to 1500 nm. The fourth optical signal transmitted by the second optical transmitter is an upstream signal that satisfies the 10GPON requirement, and the fourth optical signal is an optical signal of 1575 nm to 1580 nm. Certainly, alternatively, the first-wavelength optical signal may be an optical signal of 1310 nm, the second-wavelength optical signal may be an optical signal of 1270 nm, the third optical signal may be an optical signal of 1490 nm, and the fourth optical signal may be an optical signal of 1577 nm.

The first optical signal received by the plug-in end is a first optical signal on a first path, and the first optical signal on the first path is sent after passing through the light inlet/outlet. The first optical signal includes the first-wavelength optical signal and the second-wavelength optical signal, and the first-wavelength optical signal and the second-wavelength optical signal are diverging optical signals.

A light splitting surface of the first filter is disposed facing the light inlet/outlet, and the first optical signal passing through the light inlet/outlet can irradiate the light splitting surface of the first filter. The first filter reflects the first optical signal (the first-wavelength optical signal and the second-wavelength optical signal). In other words, the first filter reflects an optical signal in a frequency band (wavelength) of 1260 nm to 1320 nm.

The first filter reflects the first optical signal to a second path, and the second path does not coincide with the first path. Specifically, because paths before and after the first optical signal is reflected by the first filter are different, it can be ensured that the first optical signal does not reversely pass through the light inlet/outlet along the first path.

The collimation lens is further included on the second path to which the first filter reflects the first optical signal, and the first optical signal reflected by the first filter to the second path irradiates the collimation lens. The collimation lens is a lens that converts a non-parallel optical signal into a parallel optical signal and then transmits the parallel optical signal. The first optical signal irradiating the collimation lens passes through the collimation lens, and an optical signal included in the first optical signal that has passed through the collimation lens is a parallel optical signal.

A light splitting structure is further disposed in an emergent direction of the first optical signal after the first optical signal passes through the collimation lens. The light splitting structure is configured to output, through different light outlets, the first-wavelength optical signal and the second-wavelength optical signal that are included in the parallel first optical signal. There may be a plurality of forms for the light splitting structure. This is not limited in this application.

Optionally, a second filter may further be disposed between the collimation lens and the light splitting structure. The second filter may transmit an optical signal in a frequency band of 1260 nm to 1320 nm. The second filter is configured to filter an optical signal, other than the optical signal in the frequency band of 1260 nm to 1320 nm, that passes through the collimation lens and that is in another frequency band, so as to avoid that an optical signal that passes through the second filter to enter the light splitting structure includes the optical signal in the another frequency band other than the optical signal in the frequency band of 1260 nm to 1320 nm.

The first light inlet is disposed on a side surface of the base far away from the light inlet/outlet, and the light inlet/outlet and the first light inlet are disposed on two sides of the first filter, respectively. The first optical transmitter is further disposed at the first light inlet, the first optical transmitter disposed at the first light inlet transmits a third optical signal, and a path of the third optical signal is an $A^{th}$ path. The third optical signal is a converged optical signal. The third optical signal on the $A^{th}$ path passes through the first filter and is transmitted to the light inlet/outlet, so that the plug-in end can receive the third optical signal. In a special example, a phase difference between the first path and the $A^{th}$ path is 180°.

The second light inlet is disposed between the first filter and the first light inlet, the second optical transmitter is further disposed at the second light inlet, the second optical transmitter disposed at the second light inlet transmits a fourth optical signal, and the fourth optical signal is an optical signal on a $B^{th}$ path. The fourth optical signal on the $B^{th}$ path overlaps the third optical signal on the $A^{th}$ path. The fourth optical signal is a converged optical signal.

The third filter is disposed at a position at which the $B^{th}$ path intersects with the $A^{th}$ path. In an example, if the third optical signal is an optical signal in a horizontal direction, the fourth optical signal overlaps the third optical signal.

The third filter reflects the fourth optical signal and transmits the third optical signal. A light splitting surface of the third filter is disposed facing the second light inlet. The fourth optical signal on the $B^{th}$ path is incident on the light splitting surface of the third filter, and the third filter reflects the fourth optical signal along a $C^{th}$ path. The fourth optical signal reflected by the third filter on the $C^{th}$ path is transmitted to the light inlet/outlet, so that the plug-in end can receive the fourth optical signal.

Optionally, a fourth filter is further disposed on the base on the $A^{th}$ path between the first light inlet and the third filter, and the fourth filter transmits the third optical signal.

In this specific embodiment of this application, each filter is only a specific embodiment of this application, and another filter may alternatively be added to the optical component in this application depending on a function requirement based on this embodiment of this application.

It should be noted that, that a cross-sectional shape of each filter mentioned above in this application is a rectangular is only a specific example in this application and cannot be used to limit this application. The cross-sectional shape of the filter in this application may alternatively be set to any other shape such as a trapezoid, provided that the shape can be used to reflect an optical signal of a specified wavelength. This is not limited in this application. In an example, when the cross-sectional shape of the filter is a trapezoid, a hypotenuse of the trapezoid is a reflecting surface of the filter.

In this application, after the plug-in end receives the first optical signal, the first filter is directly used to separate the first optical signal (an upstream signal including the first-wavelength optical signal and the second-wavelength optical signal) from a main optical path. This avoids problems of a complex optical component structure and use of excessive collimation lenses caused when the first-wavelength optical signal and the second-wavelength optical signal that are included in the first optical signal are separately separated from the main optical path, thereby simplifying an optical component structure and reducing costs of the optical component.

Figure 3:
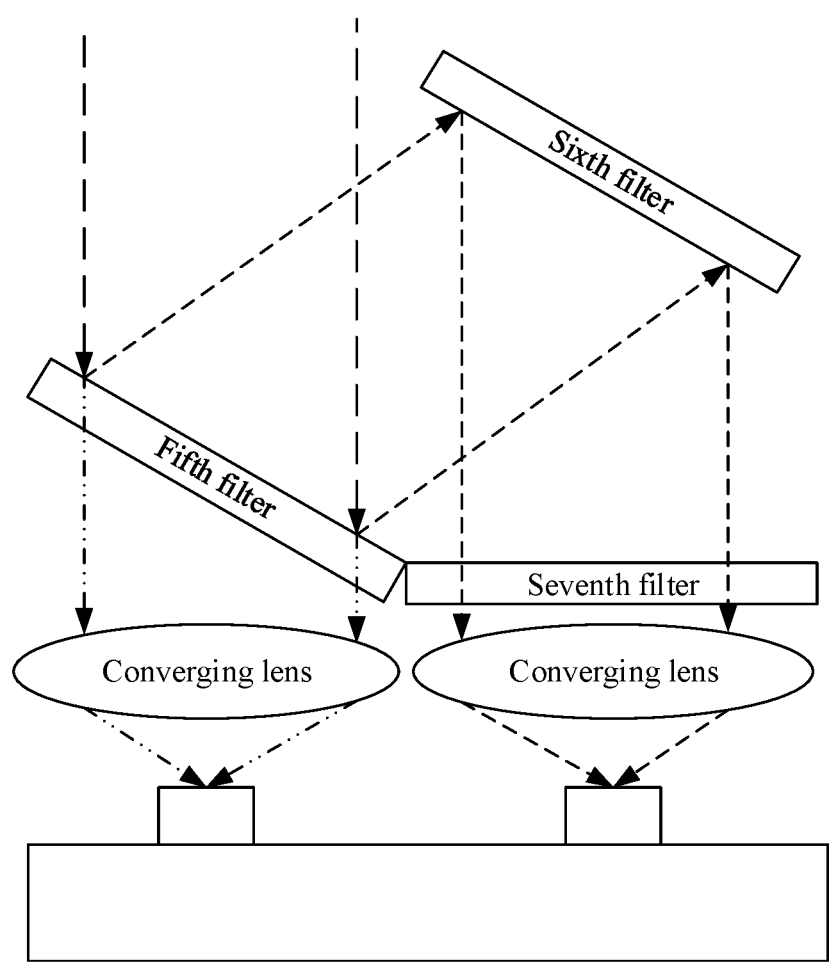
FIG. 3 shows a light splitting structure according to a specific embodiment of this application.

FIG. 3 shows a light splitting structure according to a specific embodiment of this application. As shown in FIG. 3, the light splitting structure is configured to split, into a first-wavelength optical signal and a second-wavelength optical signal, a first optical signal that is transmitted by a collimation lens and that includes the first-wavelength optical signal and the second-wavelength optical signal, and output the optical signals through different light outlets. As shown in FIG. 3, the light splitting structure includes a fifth filter, a sixth filter, and a seventh filter.

Optical signals, transmitted through the collimation lens, of the first optical signal include the first-wavelength optical signal and the second-wavelength optical signal, and both the first-wavelength optical signal and the second-wavelength optical signal are parallel optical signals.

The fifth filter is further disposed in a direction in which the first optical signal passes through the collimation lens. The fifth filter is configured to reflect the first-wavelength optical signal and transmit the second-wavelength optical signal, or the fifth filter is configured to reflect the second-wavelength optical signal and transmit the first-wavelength optical signal. In other words, the fifth filter can be configured to filter both the first-wavelength optical signal and the second-wavelength optical signal. This is not limited in this application.

The following provides a detailed description by using an example in which the fifth filter reflects the second-wavelength optical signal and transmits the first-wavelength optical signal. A light splitting surface of the fifth filter is not perpendicular to a light splitting surface passing through the fifth filter, so as to avoid that the fifth filter reflects the second-wavelength optical signal in a direction opposite to that of a second path.

A first light outlet and a second light outlet are further disposed on a base corresponding to the light splitting structure.

The first light outlet is disposed on the base in a transmission direction of the first-wavelength optical signal having passing through the fifth filter. A first optical receiver is disposed inside the first light outlet, and the first optical receiver receives the first-wavelength optical signal and sends the first-wavelength optical signal to a user side.

Optionally, a converging lens is further disposed between the first light outlet and the fifth filter, and the converging lens is configured to convert parallel light of the first-wavelength optical signal passing through the fifth filter into converged light.

The fifth filter reflects the second-wavelength optical signal along a third path. A sixth filter is further disposed in a direction in which the fifth filter reflects the second-wavelength optical signal along the third path, and the sixth filter reflects the second-wavelength optical signal. The sixth filter reflects the second-wavelength optical signal along a fourth path, and the fourth path does not coincide with the third path.

In an example, the fifth filter and the sixth filter are disposed in parallel to each other. When the fifth filter is parallel to the sixth filter, a direction in which the second-wavelength optical signal is reflected is the same as and parallel to a direction in which the first optical signal passes through the collimation lens.

The second light outlet is disposed on the fourth path on which the sixth filter reflects the optical signal of the second wavelength. A second optical receiver is disposed at the second light outlet, and the second optical receiver is configured to receive the second-wavelength optical signal and transmit the second-wavelength optical signal to a corresponding user side.

Optionally, a converging lens and a seventh filter are further disposed between the second light outlet and the sixth filter, and the second-wavelength optical signal is transmitted through the converging lens and the seventh filter. The seventh filter and the converging lens are disposed in an overlapping manner. The seventh filter is configured to filter an optical signal other than the second-wavelength optical signal, to reduce other mixed signals received by the second optical receiver. The converging lens is configured to convert, into converged light, parallel light of the second-wavelength optical signal reflected by the sixth filter, facilitating signal reception performed by the second optical receiver.

In this specific embodiment of this application, a first optical transmitter and a second optical transmitter may be of independent structures. The following separately provides detailed descriptions by using specific embodiments.

It should be noted that, that the light splitting structure includes the converging lens is only an example in this specific embodiment of this application. In this specific embodiment of this application, the light splitting structure may alternatively not include a converging lens. When the light splitting structure does not include a converging lens, the first optical receiver and the second optical receiver that are disposed inside the first light outlet and the second light outlet each include a converging lens, so as to convert parallel light of the first-wavelength optical signal passing through the fifth filter into converged light, and convert, into converged light, parallel light of the second-wavelength optical signal reflected by the sixth filter.

Figure 4:
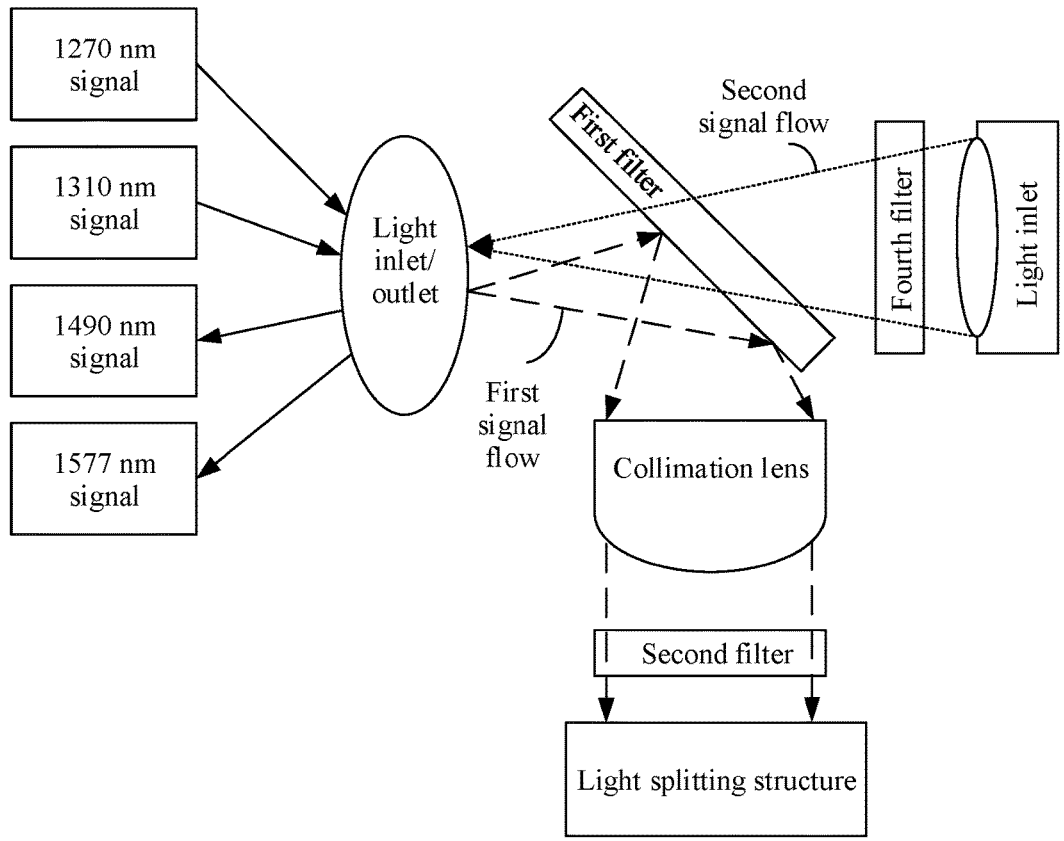
FIG. 4 is a schematic structural diagram of another quad optical component according to a specific embodiment of this application.

FIG. 4 is a schematic structural diagram of another quad optical component according to a specific embodiment of this application. As shown in FIG. 4, the schematic structural diagram of the quad optical component shows an improvement based on the structure of the quad optical component shown in FIG. 2. The quad optical component includes a base and a light splitting structure, a first filter, a second filter, a fourth filter, and a collimation lens that are disposed on the base. In an example shown in FIG. 4, the base is further provided with a light inlet, a first light outlet, and a second light outlet. A light inlet/outlet, the first light outlet, and the second light outlet that are disposed on the base and the first filter, the collimation lens, the second filter, the light splitting structure, and the fourth filter that are disposed on the base have same structures, positions, and functions as corresponding parts in FIG. 2 and FIG. 3. Details are not described in this application.

The light inlet disposed on the base is disposed in a same position as the first light inlet shown in FIG. 2. A third optical transmitter is further connected to the light inlet shown in FIG. 4, and the third optical transmitter is configured to transmit a third optical signal and a fourth optical signal through multiplexing. The third optical signal and the fourth optical signal may be the same as those shown in FIG. 2. Details are not described in this application.

Figure 5:
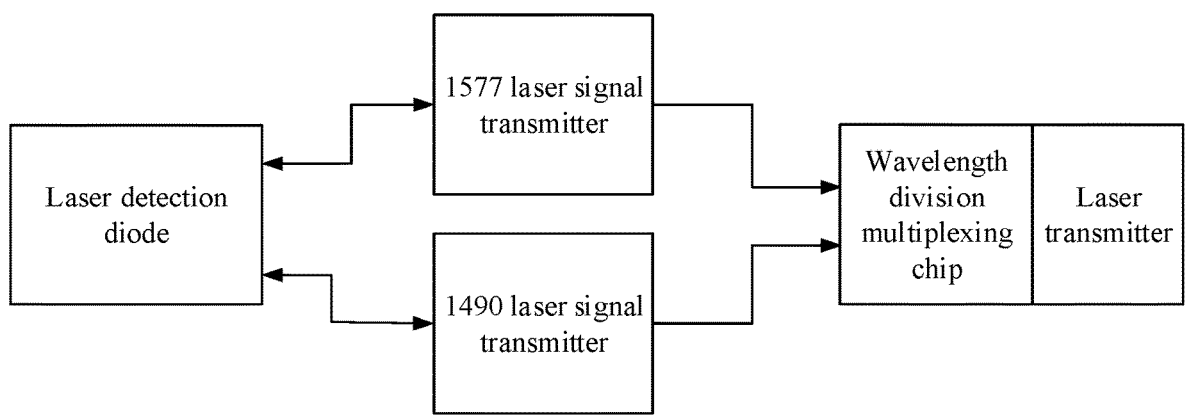
FIG. 5 shows a third optical transmitter according to a specific embodiment of this application.

FIG. 5 shows a third optical transmitter according to a specific embodiment of this application. As shown in FIG. 5, the third optical transmitter includes a 1557-nm laser signal transmitter, a 1490-nm laser signal transmitter, and a wavelength division multiplexing filter (Wavelength division multiplexing filter, WDM filter). The wavelength division multiplexing filter (a multiplexing-based transmitter apparatus) includes a wavelength division multiplexing chip (Wavelength division multiplexing chip, WDM chip) and a laser signal transmitter. The 1557-nm laser signal transmitter is configured to transmit a 1557-nm laser signal, and a signal output by the 1557-nm laser signal transmitter is coupled into the wavelength division multiplexing chip. The 1490-nm laser signal transmitter is configured to transmit a 1490-nm laser signal, and a signal output by the 1490-nm laser signal transmitter is electrically connected to the wavelength division multiplexing chip. The wavelength division multiplexing chip is configured to perform, according to the signal output by the 1557-nm laser signal transmitter and the signal output by the 1490-nm laser signal transmitter, modulation to obtain a multiplexed third optical signal and fourth optical signal. The laser signal transmitters are connected to the wavelength division multiplexing chip and transmit the corresponding laser signals. The third optical signal and the fourth optical signal transmitted through multiplexing by the laser signal transmitters are output through the light inlet.

Optionally, a signal output interface of the 1557-nm laser signal transmitter and a signal output interface of the 1490-nm laser signal transmitter are both connected to a backlight detection device. The backlight detection device is configured to determine light intensity of the obtained signal sent by the 1557-nm laser signal transmitter and the obtained signal sent by the 1490-nm laser signal transmitter, based on the signals. When determining that light intensity of an optical signal sent by each laser signal transmitter is less than a predetermined threshold, the backlight detection device further sends information to a corresponding laser signal transmitter, where the information is used to instruct that the laser signal transmitter to enhance light intensity of a transmitted optical signal.

In the foregoing embodiment of this application, the third optical transmitter transmits the third optical signal and/or the fourth optical signal through multiplexing. Because the optical component uses fewer devices to achieve a same effect, a structure of the quad optical component is simpler.

In a specific example, the backlight detection device stores a light intensity threshold corresponding to the 1490-nm laser signal transmitter and a light intensity threshold corresponding to the 1557-nm laser signal transmitter. The backlight detection device obtains, from the signal output interface of the 1557-nm laser signal transmitter, intensity of the optical signal transmitted by the 1557-nm laser signal transmitter. The backlight detection device compares the intensity of the optical signal transmitted by the 1557-nm laser signal transmitter with the stored light intensity threshold corresponding to the 1557-nm laser signal transmitter. If the intensity of the optical signal transmitted by the 1557-nm laser signal transmitter is in a range of the light intensity threshold, the backlight detection device does not perform any processing; and if the intensity of the optical signal transmitted by the 1557-nm laser signal transmitter is out of the range of the light intensity threshold, the backlight detection device transmits indication information to the 1557-nm laser signal transmitter. The 1557-nm laser signal transmitter transmits light intensity of the transmitted optical signal adjusted based on the indication information.

Optionally, the third optical transmitter further includes a converging lens (a cap), and the cap is disposed on a path of the third optical signal and the fourth optical signal transmitted by the laser signal transmitters through multiplexing. The converging lens may be disposed on a package structure of the third optical transmitter or on the base. This is not limited in this application.

The following details the base by using a specific embodiment.

Figure 6:
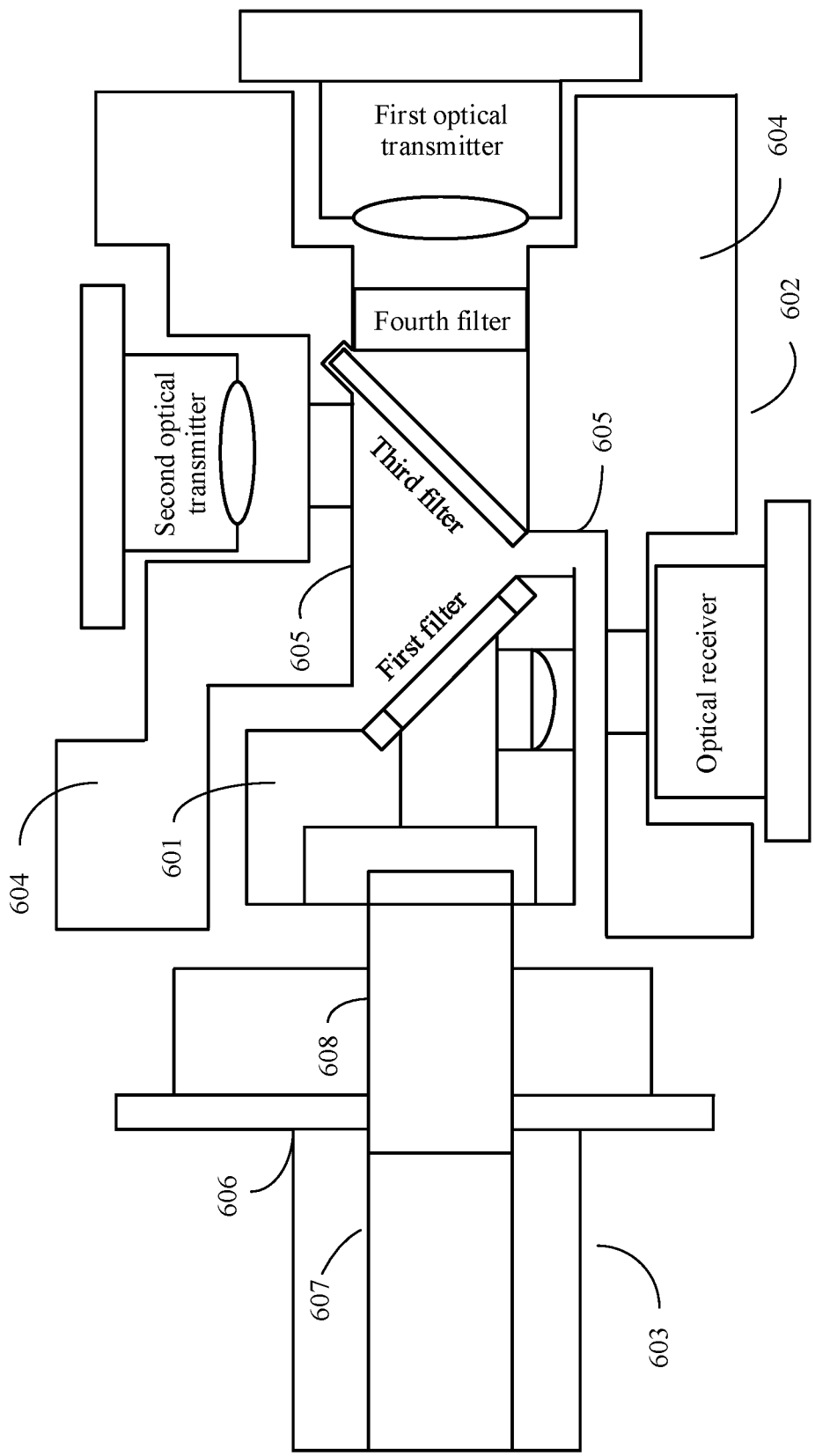
FIG. 6 is a schematic structural diagram of an optical component according to a specific embodiment of this application.

FIG. 6 is a schematic structural diagram of an optical component according to a specific embodiment of this application. As shown in FIG. 6, the optical component includes a base and an optical device and a plug-in end 603 that are disposed on the base. The optical device includes the first filter, the second filter, the third filter, the fourth filter, the light splitting structure, the collimation lens, and the like in FIG. 2 to FIG. 5.

The base includes a support 601 and a connecting pipe body 602, and the support 601 is disposed inside the connecting pipe body 602.

In this specific embodiment of this application, the collimation lens, the first filter, and the plug-in end 603 are disposed on the support 601, and the light splitting structure and the third filter are disposed on the connecting pipe body 602.

The following details structures of the support 601 and the collimation lens, the first filter, and the plug-in end 603 that are disposed on the support 601.

Figure 7:
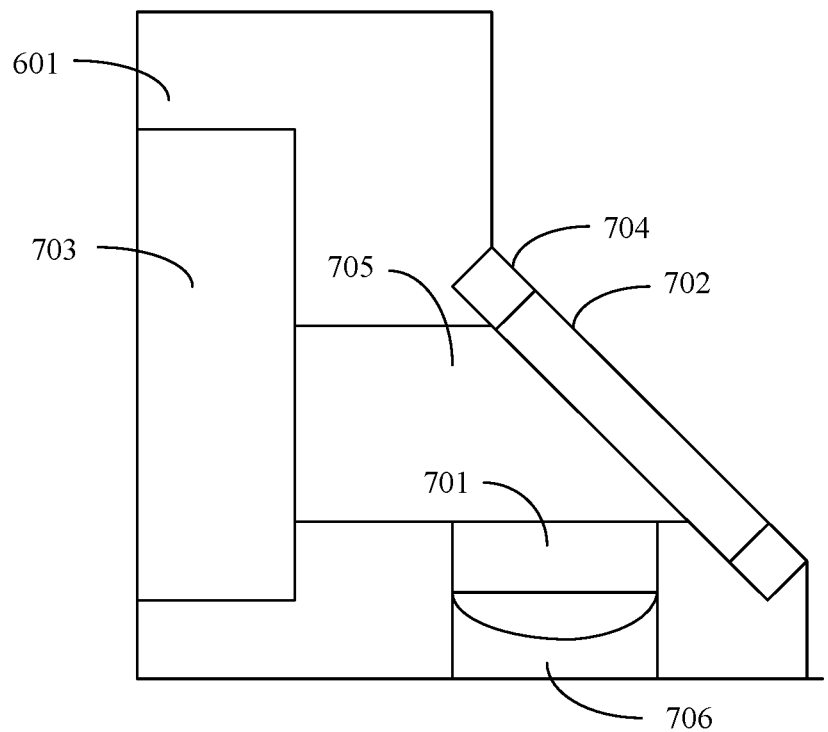
FIG. 7 is a schematic structural diagram of a support according to a specific embodiment of this application.

FIG. 7 is a schematic structural diagram of a support according to a specific embodiment of this application. As shown in FIG. 7, the support includes a support 601 and a collimation lens 701, a first filter 702, and a first connecting hole 703 that are disposed on the support 601.

There is a first connecting hole 703 on one side of the support 601, and the first connecting hole 703 is used to accommodate the plug-in end 603. A shape and a size of the first connecting hole 703 match those of the plug-in end 603 inserted in the first connecting hole 703. The plug-in end 603 is configured to input/output an optical signal. In this embodiment of this application, the plug-in end 603 can receive a first optical signal on a first path, where the first optical signal includes a first-wavelength optical signal and a second-wavelength optical signal. The first-wavelength optical signal and the second-wavelength optical signal may be the same as those shown in FIG. 1 and FIG. 2.

A first filter installation site 704 is further included on the other side of the support 601 relative to the first connecting hole 703, and a first filter 702 may be disposed in the first filter installation site 704.

The support 601 is further provided with a first light through hole 705 penetrating through the support 601. One side of the first light through hole 705 is penetrated through the first connecting hole 703, and the other side of the first light through hole 705 is penetrated through the first filter installation site 704. Optionally, the first light through hole 705 further coincides with the first path, to avoid signal interference caused when the first optical signal irradiates an inner wall of the first light through hole 705.

The first-wavelength optical signal and the second-wavelength optical signal that are output by the plug-in end 603 irradiate, through the first light through hole 705, the first filter 702 disposed at the first filter installation site 704.

In an example, if cross sections of both the first light through hole 705 and the first filter installation site 704 are cylindrical, an included angle between an axis of the first light through hole 705 and an end surface of the first filter installation site 704 is not equal to 90 degrees. In other words, the first filter installation site 704 is obliquely disposed relative to the axis of the first light through hole 705. The first filter 702 is disposed at the first filter installation site 704, and the first filter 702 disposed at the first filter installation site 704 reflects the first optical signal along a second path. The first path does not coincide with the second path. A second light through hole 706 is further included on the second path on which the first filter 702 on the support 601 reflects the first optical signal, and the second light through hole 706 is penetrated through the first light through hole 705.

The collimation lens 701 is disposed in the second light through hole 706. The first optical signal reflected by the first filter 702 along the second path passes through the collimation lens 701. The collimation lens 701 is configured to convert, into a parallel first optical signal for output, a diverging first optical signal reflected by the first filter 702 to the collimation lens 701. In other words, the first optical signal input into the collimation lens 701 is a diverging optical signal, and the first optical signal output by the collimation lens 701 is a parallel optical signal.

Optionally, the support 601 may be processed and molded by using an injection molding technique. The first filter 702 may be directly placed at the first filter installation site 704 of the injection-molded support 601. The first filter 702 may alternatively be disposed in a corresponding position of an injection molding model during an injection molding process of the support 601, so that the injection-molded support 601 and the first filter 702 form a whole. The collimation lens 701 may be disposed in a corresponding position of the injection molding model during the injection molding process of the support 601, so that the injection-molded support 601 and the collimation lens 701 form a whole.

The first optical signal (including the first-wavelength optical signal and the second-wavelength optical signal) passing through the collimation lens 701 is output through a first light outlet and a second outlet disposed on the connecting pipe body 602.

The connecting pipe body 602 is a shell structure with a cut-through middle part, and includes a shell 604 and a through hole 605.

The support 601 is disposed on one side of the through hole 605. One side of the first connecting hole 703 of the support 601 is close to an end surface of the connecting pipe body 602, and one side of the first filter installation site 704 on the support 601 is far away from the end surface of the connecting pipe body 602. The first optical signal passes through the collimation lens 701, and a first optical receiver and a second optical receiver are further disposed on the shell 604 of the connecting pipe body 602, and the first-wavelength optical signal and the second-wavelength optical signal that pass through the collimation lens are received through the first optical receiver and the second optical receiver.

The optical component includes a light splitting structure and a plurality of optical receivers. The light splitting structure is configured to output, through different light outlets, the first-wavelength optical signal and the second-wavelength optical signal that are included in the first optical signal. The plurality of optical receivers are disposed at different light outlets, and an optical receiver is disposed at each light outlet. A structure of a receive end may be shown in FIG. 3. Details are not described in this application again.

A first optical transmitter is disposed on the other side on which no support 601 is disposed and that is of the through hole 605, and the first optical transmitter transmits a third optical signal to the support 601 along an $A^{th}$ path. The third optical signal on the $A^{th}$ path passes through the first light through hole 705 of the support 601 and the first connecting hole 703, so that the plug-in end 603 can receive the third optical signal.

Optionally, a fourth filter is further disposed in the through hole 605 between the support 601 and the first optical transmitter, and the fourth filter is configured to transmit the third optical signal.

A second optical transmitter is further disposed in the shell 604 between the support 601 and the first optical transmitter, and the second optical transmitter transmits a fourth optical signal to the support 601 along a $B^{th}$ path, where the $B^{th}$ path passes through the through hole 605. A third filter is further disposed in a position, in the through hole 605, in which the $B^{th}$ path intersects with the through hole 605. The fourth optical signal transmitted by the second optical transmitter irradiates a light splitting surface of the third filter, and the third filter reflects the fourth optical signal along a $C^{th}$ path. The fourth optical signal on the $C^{th}$ path passes through the first light through hole 705 of the support 601 and the first connecting hole 703, so that the plug-in end 603 can receive the fourth optical signal.

The plug-in end 603 includes a pin 606, and plug-in holes 607 are disposed in the pin 606. A ferrule 608 is further disposed in the plug-in hole 607 on a side, connected to the support 601, of the plug-in end 603, and a corresponding signal is received or sent by using the ferrule 608. An optical fiber is further disposed in the plug-in hole 607 on a side of the plug-in end 603 far away from the support 601, and a received or sent signal is transmitted by using the optical fiber.

Optionally, the ferrule 608 is disposed in the first connecting hole 703, and the first connecting hole 703 is configured to position the plug-in end 603 and the ferrule 608. When the ferrule 608 is disposed in the first connecting hole 703, the pin 606 is in contact with and connected to an end surface of the support 601 in which the first connecting hole 703 is located.

In this specific embodiment of this application, a first light outlet and a second light outlet on a connecting pipe body may alternatively be replaced with the light outlets shown in FIG. 4. The first light outlet on the connecting pipe body is disposed the same as the second light outlet. Details are not described in this application.

In this specific embodiment of this application, that the foregoing support 601 does not include a light splitting structure is only an example in this application. A light splitting structure may alternatively be disposed on the support 601. When the support 601 includes a light splitting structure, the light outlet does not include the light splitting structure.

The support in this specific embodiment of this application may include a first support and a second support. The first support may be the support 601 shown in FIG. 6 and FIG. 7. The second support may be configured to place a light splitting structure. The following details the second support provided in this specific embodiment of this application.

Figure 8:
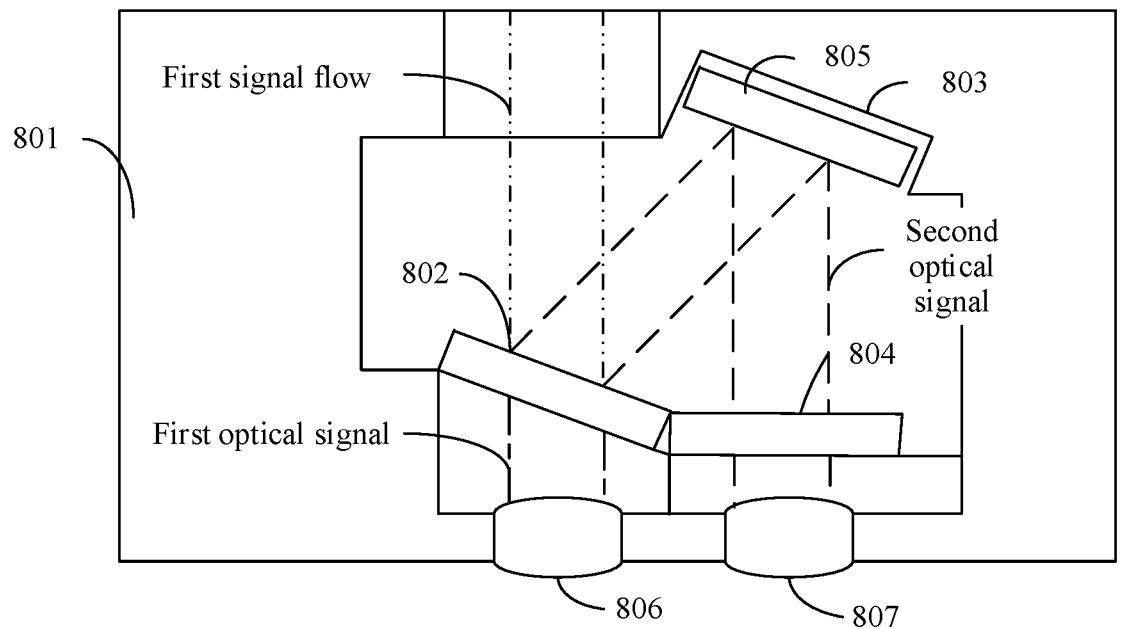
FIG. 8 shows a second support according to a specific embodiment of this application.

FIG. 8 shows a second support according to a specific embodiment of this application. As shown in FIG. 8, the second support 801 is further provided with a fifth filter installation site 802 in a direction in which a first optical signal (including a first-wavelength optical signal and a second-wavelength optical signal) passes through a collimation lens, and a fifth filter is disposed at the fifth filter installation site 802. The first optical signal passing through the collimation lens irradiates the fifth filter disposed at the fifth filter installation site 802. The fifth filter transmits the first-wavelength optical signal and reflects the second-wavelength optical signal along a third path.

When a cross section of the fifth filter is a rectangle, there is an included angle between the fifth filter disposed at the fifth filter installation site 802 and the first optical signal. In an example, an included angle between an end surface of the fifth filter installation site 802 and the first optical signal passing through the fifth filter is not equal to 90 degrees. In other words, the first optical signal does not vertically irradiate the fifth filter. The included angle between the end surface of the fifth filter installation site 802 and the first optical signal passing through the fifth filter is set based on a specific position of each structure in the second support 801. This is not limited in this application.

The second support 801 is further provided with a first converging lens installation site 806 in a direction in which the first-wavelength optical signal passes through the fifth filter, and a first converging lens is disposed at the first converging lens installation site 806. The first converging lens disposed at the first converging lens installation site 806 converts, from parallel light to converged light, the first-wavelength optical signal irradiating the first converging lens. A first optical receiver is further disposed on a first light outlet on a connecting pipe body 602 corresponding to the first converging lens installation site 806, and the first optical receiver is configured to receive the first-wavelength optical signal.

The second support 801 is further provided with a sixth filter installation site 803 in a direction in which the fifth filter reflects the second-wavelength optical signal, and a sixth filter is disposed at the sixth filter installation site 803. The sixth filter disposed at the sixth filter installation site 803 reflects the second-wavelength optical signal along a fourth path, where the fourth path does not coincide with the third path. A specific position of the fourth path is set depending on an actual requirement. This is not limited in this application.

Optionally, the second support 801 is further provided with a seventh filter installation site 804 in a direction in which the sixth filter reflects the second-wavelength optical signal, and a seventh filter is disposed at the seventh filter installation site 804. The seventh filter is a filter for filtering an optical signal of another wavelength other than the second-wavelength optical signal. A reflecting surface of the seventh filter disposed at the seventh filter installation site 804 is perpendicular to the second-wavelength optical signal reflected by the sixth filter.

The second support 801 is further provided with a second converging lens installation site 807 in a direction in which the second-wavelength optical signal passes through the seventh filter, and a second converging lens is disposed at the second converging lens installation site 807. The second converging lens disposed at the second converging lens installation site 807 converts, from parallel light to converged light, the second-wavelength optical signal irradiating the second converging lens. A second optical receiver is further disposed on the connecting pipe body 602 corresponding to the second converging lens installation site 807, and the second optical receiver is configured to receive the second-wavelength optical signal passing through the converging lens.

Optionally, the sixth filter installation site 803 is parallel to the fifth filter installation site 802, the sixth filter 805 disposed at the sixth filter installation site 803 is parallel to the fifth filter disposed in the fifth filter installation site 802, and the first-wavelength optical signal passing through the fifth filter is parallel to the second-wavelength optical signal reflected by the sixth filter 805. The first-wavelength optical signal passing through the fifth filter is parallel to the second-wavelength optical signal reflected by the sixth filter 805, so that the first converging lens and the second converging lens can be disposed in parallel to each other, and the first optical receiver and the second optical receiver can be disposed in parallel to each other.

In the schematic structural diagram of the second support shown in FIG. 8, alternatively, the first converging lens installation site, the second converging lens installation site, and the converging lenses disposed at the converging lens installation sites may not be included. When the second support 801 does not include the converging lens installation sites and the converging lenses, the first optical receiver and the second optical receiver each include a converging lens.

Optionally, the foregoing support 601 and the second support 801 may be two independent injection-molded parts and are both disposed in the connecting pipe body 602.

Certainly, the support 601 and the second support 801 may alternatively form a whole. Alternatively, the support 601 and the second support 801 may form a whole including the support 601 and the second support 801 that are injection molded at the same time, or the support 601 and the second support 801 are injection molded separately and then connected as a whole.

In this application, an integrally molded support and the connecting pipe body with a fixed structure are used, and the support is disposed in the connecting pipe body, so that a structure of an optical component is simpler. In addition, various optical devices are disposed in a base formed by the support and the connecting pipe body, so that the optical component is more conveniently disposed. Further, the collimation lens and the support are integrally injection molded, so that a position of the collimation lens relative to an optical path is more accurate.

Figure 9:
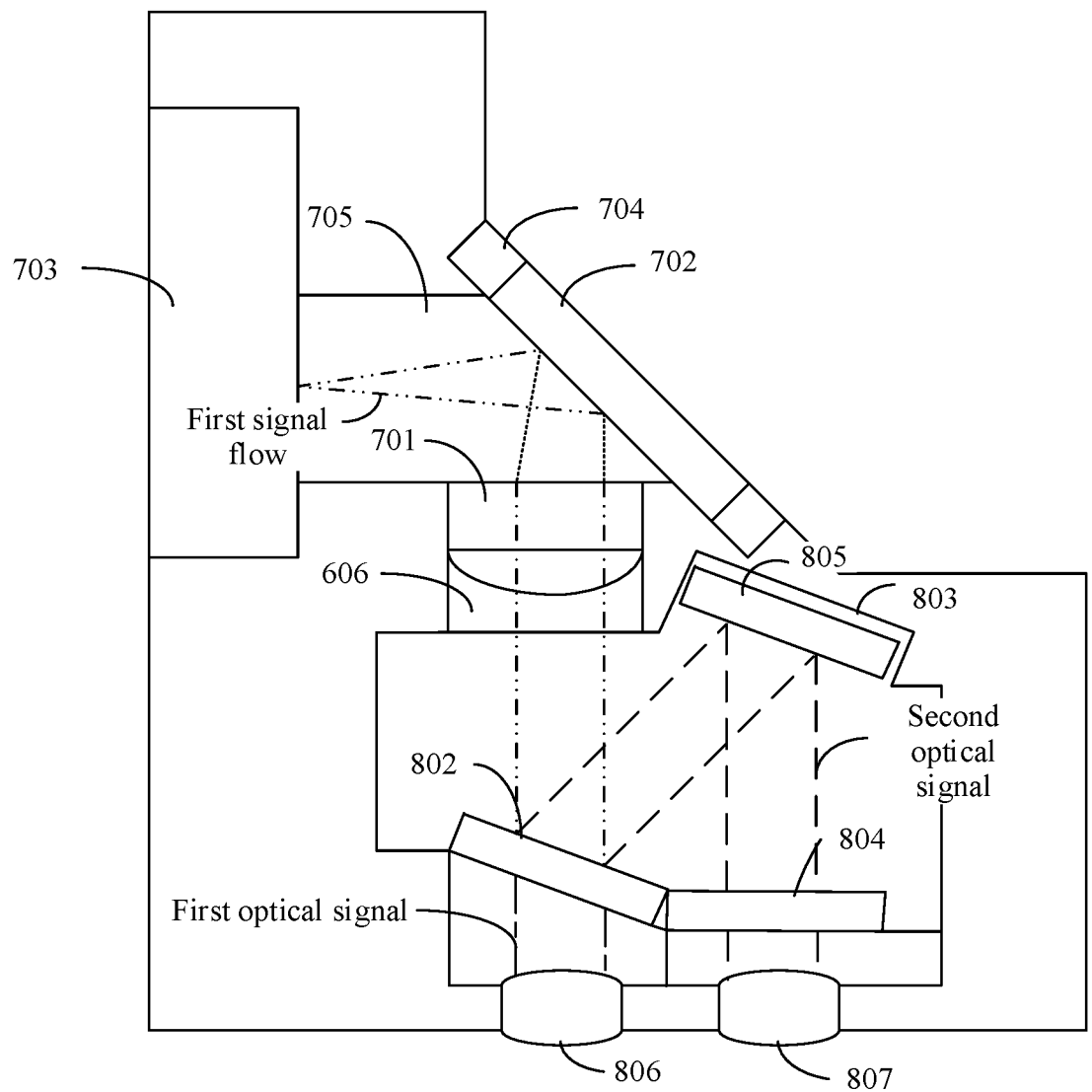
FIG. 9 is a schematic diagram of a support according to a specific embodiment of this application.

FIG. 9 is a schematic diagram of a support according to a specific embodiment of this application. As shown in FIG. 9, the support 901 includes the support 601 shown in FIG. 7 and the second support 801 shown in FIG. 8, and the support 601 and the second support 801 form a whole. A structure of the foregoing support is the same as those shown in FIG. 7 and FIG. 8. Details are not described in this application.

Certainly, the base and the support and the connecting pipe body that are included in the base in FIG. 7 to FIG. 9 are only examples in this specific embodiment of this application, and cannot constitute any limitation on this application. In this specific embodiment of this application, any structure that can connect the structures in FIG. 2 to FIG. 6 as a whole by using a specific connection structure is used as the base in this specific embodiment of this application.

This specific embodiment of this application may further be applied to an optical module. The optical module may include the optical component shown in FIG. 2 to FIG. 9.

This specific embodiment of this application may further be applied to a communications device. The communications device may include the foregoing optical module. The communications device may be an OLT or an ONU, or may be any other electronic device to which the optical module is applied.

It should be noted that the embodiments provided in this application are only optional embodiments described in this application. Based on this, a person skilled in the art can freely design more embodiments, and therefore details are not described herein.

The optical devices described as separate parts may or may not be physically separate, and some or all of the structures may be selected depending on an actual requirement to achieve the objectives of the solutions of the embodiments.

In addition, the optical devices in the embodiments of this application may be integrated into a whole structure, or each optical device may exist alone physically, or two or more optical devices may be integrated into a unit.

The foregoing descriptions are only implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical component comprising: a light splitting structure, a first filter, a connecting pipe body, a first optical receiver, a second optical receiver, and a collimation lens;
   wherein a light splitting surface of the first filter is disposed in a direction facing a light inlet and outlet, the light inlet and outlet is configured to pass optical signals, and a first optical signal on a first path is incident on the light splitting surface of the first filter through the light inlet and outlet, wherein the first optical signal comprises a first-wavelength optical signal and a second-wavelength optical signal, the first-wavelength optical signal and the second-wavelength optical signal have different wavelengths;
   wherein the light splitting surface of the first filter reflects the first optical signal to the collimation lens along a second path, wherein the first path does not coincide with the second path, wherein the collimation lens is disposed on the second path, wherein the first optical signal reflected by the first filter to the collimation lens comprises the first-wavelength optical signal and the second-wavelength optical signal that are two non-parallel lights, and the collimation lens is configured to convert the first-wavelength optical signal and the second-wavelength optical signal as two parallel lights; and
   wherein the light splitting structure is disposed on an emergent path of the two parallel lights, and wherein the light splitting structure is configured to output the two parallel lights to be received by the first optical receiver and the second optical receiver disposed in parallel on a shell of the connecting pipe body.

2. The optical component according to claim 1, wherein the light splitting structure comprises a fifth filter and a sixth filter;
   wherein the fifth filter is disposed on the emergent path of the first-wavelength optical signal and the second-wavelength optical signal after the first-wavelength optical signal and the second-wavelength optical signal pass through the collimation lens, and the fifth filter transmits the first-wavelength optical signal and reflects the second-wavelength optical signal along a third path, wherein the third path does not coincide with the second path;
   wherein the sixth filter is disposed on the third path, the sixth filter reflects the second-wavelength optical signal along a fourth path, and the fourth path does not coincide with the third path; and
   wherein the optical component further comprises a first light outlet and a second light outlet, the first light outlet is disposed on a transmission path on which the fifth filter transmits the first-wavelength optical signal, the first light outlet allows the first-wavelength optical signal to pass through, the second light outlet is disposed on the fourth path, and the second light outlet allows the second-wavelength optical signal to pass through.

3. The optical component according to claim 2, wherein the first optical receiver is disposed on an emergent path at the first light outlet to receive the first-wavelength optical signal, and the second optical receiver is disposed on an emergent path at the second light outlet to receive the second-wavelength optical signal.

4. The optical component according to claim 2, wherein the second path is parallel to the fourth path.

5. The optical component according to claim 2, wherein the light splitting structure further comprises a seventh filter, the seventh filter is disposed on the fourth path between the sixth filter and the second light outlet, and the seventh filter transmits the second-wavelength optical signal.

6. The optical component according to claim 1, further comprises a third filter, a first light inlet, and a second light inlet; wherein a third optical signal and a fourth optical signal having different wavelengths respectively passes through the first light inlet and the second light inlet and irradiate the third filter, and the third filter reflects or transmits, to the light inlet and outlet, the third optical signal and the fourth optical signal.

7. The optical component according to claim 6, wherein the first light inlet is disposed opposite to the light inlet and outlet, and the third optical signal is transmitted on a fifth path passes through the first light inlet and is incident on the light inlet and outlet; and
wherein a light splitting surface of the third filter is disposed facing the second light inlet, the fourth optical signal is transmitted on a sixth path and is incident on the light splitting surface of the third filter through the second light inlet, and the third filter reflects the fourth optical signal to the light inlet and outlet along a seventh path.

8. The optical component according to claim 1, wherein the optical component comprises a support structure disposed on the connecting pipe body, the support structure comprises a first support structure for fastening the first filter and the collimation lens, and the light inlet and outlet is disposed on the first support structure.

9. The optical component according to claim 8, wherein the collimation lens and the first support structure are integrally injection molded.

10. The optical component according to claim 8, wherein the support structure further comprises a second support structure for fastening the light splitting structure.

11. The optical component according to claim 10, further comprises a first converging lens disposed on the second path and a second converging lens disposed on a fourth path, and the second support structure fastens the first converging lens and the second converging lens.

12. The optical component according to claim 11, wherein the first converging lens and the second support structure are integrally injection molded, and the second converging lens and the second support structure are integrally injection molded.

13. The optical component according to claim 10, wherein the first support structure and the second support structure are integrally injection molded.

14. The optical component according to claim 1, further comprises a pin and a ferrule, the pin has a pin-in hole, the ferrule is disposed in the pin through the pin-in hole with one end of the ferrule protrudes from the pin.

15. The optical component according to claim 1, further comprises a multiplexing-based transmitter apparatus, and the multiplexing-based transmitter apparatus is disposed opposite to the light inlet and outlet; wherein the multiplexing-based transmitter apparatus transmits a third optical signal and a fourth optical signal on a fifth path, and the third optical signal and the fourth optical signal on the fifth path are transmitted to the light inlet and outlet.

16. An optical module, wherein the optical module comprises a light splitting structure, a first filter, and a collimation lens;
wherein a light splitting surface of the first filter is disposed in a direction facing a light inlet and outlet, the light inlet and outlet is configured to pass optical signals, and a first optical signal on a first path is incident on the light splitting surface of the first filter through the light inlet and outlet;
wherein the light splitting surface of the first filter reflects the first optical signal to the collimation lens along a second path, wherein the first path does not coincide with the second path, wherein the collimation lens is disposed on the second path, wherein the first optical signal reflected by the first filter to the collimation lens comprises at least two non-parallel lights, and the collimation lens is configured to convert the at least two non-parallel lights on the second path into at least two parallel lights; and
wherein the first optical signal has at least one type of wavelength, the light splitting structure is disposed on an emergent path of the first optical signal after the first optical signal passes through the collimation lens, and the light splitting structure is configured to output, based on a wavelength type, the first optical signal adjusted by the collimation lens.

17. A communications device, wherein the communications device comprises an optical module, wherein the optical module comprises: a light splitting structure, a first filter, a connecting pipe body, a first optical receiver, a second optical receiver, and a collimation lens;
wherein a light splitting surface of the first filter is disposed in a direction facing a light inlet and outlet, the light inlet and outlet is configured to pass optical signals, and a first optical signal on a first path is incident on the light splitting surface of the first filter through the light inlet and outlet, wherein the first optical signal comprises a first-wavelength optical signal and a second-wavelength optical signal, the first-wavelength optical signal and the second-wavelength optical signal have different wavelengths;
wherein the light splitting surface of the first filter reflects the first optical signal to the collimation lens along a second path, wherein the first path does not coincide with the second path, wherein the collimation lens is disposed on the second path, wherein the first optical signal reflected by the first filter to the collimation lens comprises the first-wavelength optical signal and the second-wavelength optical signal that are two non-parallel lights, and the collimation lens is configured to convert the first-wavelength optical signal and the second-wavelength optical signal as two parallel lights; and
wherein the light splitting structure is disposed on an emergent path of the two parallel lights, and wherein the light splitting structure is configured to output the two parallel lights to be received by the first optical receiver and the second optical receiver disposed in parallel on a shell of the connecting pipe body.

18. The communications device according to claim 17, wherein the communications device comprises a support structure disposed on the connecting pipe body, the support structure comprises a first support structure for fastening the first filter and the collimation lens, and the light inlet and outlet is disposed on the first support structure.

19. The communications device according to claim 18, wherein the collimation lens and the first support structure are integrally injection molded.

20. The communications device according to claim 18, wherein the support structure further comprises a second support structure for fastening the light splitting structure.

* * * * *